(12) United States Patent
Witzigreuter

(10) Patent No.: US 6,464,215 B1
(45) Date of Patent: Oct. 15, 2002

(54) VIBRATION DAMPING MOUNT FOR A METAL-AIR BATTERY OR THE LIKE

(75) Inventor: John Douglas Witzigreuter, Kennesaw, GA (US)

(73) Assignee: AER Energy Resources, Inc., Smyrna, GA (US)

(*) Notice: Subject to any disclaimer, the term of this patent is extended or adjusted under 35 U.S.C. 154(b) by 0 days.

(21) Appl. No.: 09/669,519

(22) Filed: Sep. 25, 2000

(51) Int. Cl.⁷ .................................................. F16F 1/18

(52) U.S. Cl. ........................................ 267/160; 188/380

(58) Field of Search ............................... 188/378, 379, 188/880; 267/136, 140.5, 158, 150, 140.12, 160, 179, 199; 416/134 A, 500; 74/552, 574

(56) References Cited

U.S. PATENT DOCUMENTS

| | | | |
|---|---|---|---|
| 4,152,095 A | | 5/1979 | McKelvey |
| 4,317,176 A | * | 2/1982 | Saar .............................. 364/474 |
| 4,619,349 A | * | 10/1986 | Braun .......................... 188/380 |
| 5,208,730 A | | 5/1993 | Tracy |
| 5,304,431 A | | 4/1994 | Schumm, Jr. |
| 5,308,224 A | | 5/1994 | Olivero et al. |
| 5,346,362 A | | 9/1994 | Bonner et al. |

* cited by examiner

Primary Examiner—Jack Lavinder
Assistant Examiner—C. T. Bartz
(74) Attorney, Agent, or Firm—Alston & Bird LLP

(57) ABSTRACT

A device for damping vibration in mounting vibration-prone devices, such as fans or other devices with moving parts. A fan may be mounted at the center of a spiral spring to prevent transmission of vibrations including sounds from the fan to a surrounding structure, such as a cell phone powered by a metal-air battery.

20 Claims, 3 Drawing Sheets

VIBRATION DAMPING MOUNT FOR A METAL-AIR BATTERY OR THE LIKE

FIELD OF THE INVENTION

The present invention relates to damping vibrations in mounting vibration-prone devices, such as fans or other devices with moving parts, and more particularly relates to a mount relying on a spring to prevent transmission of vibrations including sounds from a vibration-prone device to a surrounding structure.

BACKGROUND OF THE INVENTION

Many types of equipment include both components that cause vibrations and components that are sensitive to vibrations. One example is scientific equipment containing sensitive transducers as well as heavier components such as vacuum pumps. Other sensitive measuring devices may be associated with computer processors that require cooling fans. Attempts have been made to isolate fan vibrations by suspending the fan from a network of coil springs, as shown in U.S. Pat. No. 5,308,224, or by hanging the fan on a cantilever beam.

The need to isolate computer cooling fans to prevent vibration and attendant housing structure vibration noise, is recognized in U.S. Pat. No. 5,208,730. However, a complex resilient mounting apparatus is described to address the problem.

A cordless or cellular telephone powered by a fan-ventilated metal-air battery presents a difficult challenge because the components must be very small and also must not produce noise that would interfere with a conversation over the telephone. Space within the apparatus cannot be spared for spring suspension systems.

Thus, there has been a need in the art for a simple, inexpensive vibration damping mount, useable with miniaturized electronic components, and capable of effectively preventing vibration and noise without occupying any significant space.

SUMMARY OF THE INVENTION

The present invention seeks to provide a vibration damping mount capable of minimizing vibration and noise while minimizing the space it occupies. The invention also seeks to provide a vibration damping mount suitable for use with hand held electronic devices.

These objects are accomplished by providing a mount that includes a spring shaped to support the vibration-prone device and damp its vibrations. The mount can be shaped to adapt to the device it is holding and to the surrounding hardware for the purpose of minimizing the space it occupies.

Generally described, the present invention provides a damping device for mounting a vibration-prone device to a structure, comprising a retainer shaped to receive the vibration-prone device; a spring extending from the retainer in an arc, the spring being held to the structure at a location spaced along the arc from the retainer. In selecting a particular structure for the spring, many variations are possible. The arc may be smooth or may be a plurality of connected discrete segments. Preferably, the arc is shaped to turn through at least 180 degrees. In some applications a full turn or multiple turns will provide optimal support and damping.

In a preferred embodiment, the spring is a spiral, the turns of which may lie generally in one plane. In the alternative, the turns may lie on a three dimensional shape such as a cone, hemisphere, or pyramid. The planar spring mount is space efficient. The spiral may comprise wire shaped at the center of the spiral to receive a part of the mounted device. Also, an outer turn can be shaped to be received in a peripheral groove provided by the structure. For example, when the vibration-prone device is a fan, a mandrel from the central stator member of the fan may be held in a winding at the center of the spiral, and the spiral may be positioned in an opening in a wall of a housing with the outer turn fitted in a groove in the opening. With the spiral mount thus generally coplanar with wall of the housing, and positioned in the opening required for air supply to the fan, little or no additional space is needed for the mount.

The present invention further contemplates a ventilation system including a fan mounted on a damping device as described above, and a metal-air cell housing including a fan mounted on a similar damping device. The present invention is particular useful in cellular telephones where noise due to vibration is undesirable.

According to another aspect of the invention a vibration-damping fan mount is provided, comprising a support member having a thickness and defining therethrough an opening having a peripheral wall; and a spiral spring defining a central fitting shaped to engage a portion of a fan and an outer turn shaped to engage the peripheral wall of the opening. The peripheral wall of the opening may optionally define a groove, and the outer turn of the spiral spring may fit into the groove. Preferably, the groove encircles the peripheral wall, and the outer turn forms a loop that resiliently snaps into the groove.

According to another aspect of the invention, a damping device for mounting a vibration-prone device to a structure is provided, comprising a retainer shaped to receive a vibration-prone device; and a spring extending from the retainer in a figure, the spring being held to the structure at a location spaced along the figure from the retainer, and the shape of the figure between the retainer and the structure allowing resilient motion in at least two orthogonal directions. In a preferred embodiment, the resilient motion allowed by the spring is omni-directional.

Other objects, features, and advantages of the present invention will become apparent upon review of the following description of embodiments of the invention, when taken in conjunction with the drawings and the appended claims.

BRIEF DESCRIPTION OF THE DRAWINGS

Some of the advantages of the present invention having been stated, others will appear as the description proceeds, when considered in conjunction with the accompanying drawings, which are not necessarily drawn to scale, in which.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limit ed to the embodiments set forth herein; rather, these embodiments are provided so that this disclosure will be thorough and complete, and will fully convey the scope of the invention to those skilled in the art. Like numbers refer to like elements throughout.

Figure 1:
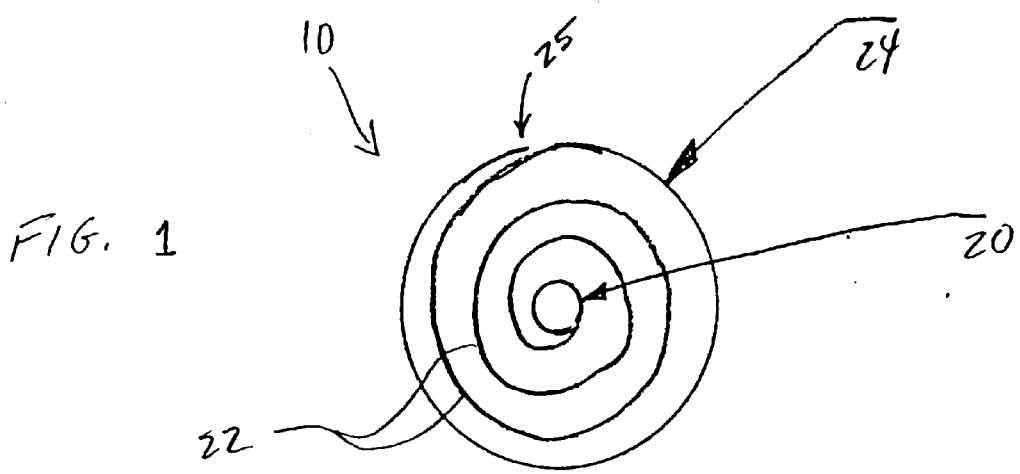
FIG. 1 is a plan view of a vibration damping mount embodying the present invention.
Figure 2:
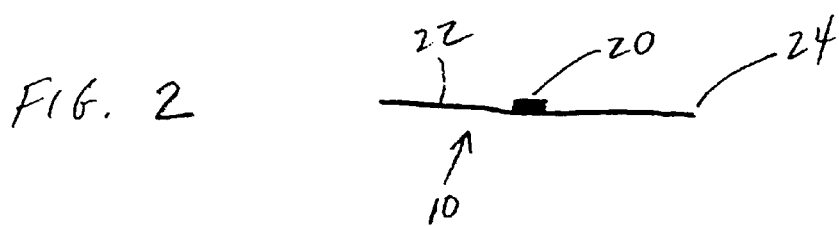
FIG. 2 is a side view of the mount of FIG. 1.

FIG. 1 shows a plan view of a preferred embodiment of a vibration damping mount 10 according to the present invention. The preferred mount 10 is made from a single piece of piano wire formed into a spiral spring. The mount 10 includes a central retainer 20 formed as a winding from the inner end of the wire into a cylinder three coils high and having an inside diameter of about 0.13 inch . The shape and size of the retainer 20 can be varied depending on the shape of a member to be engaged by the retainer in mounting a vibration-prone device, as described below. From the retainer 20, the wire spirals outwardly for three and one-half turns 22. The outer turn gradually approaches the next inner turn at a wire end 25 to form a circular periphery 24 of the mount spring 10.

Figure 5:
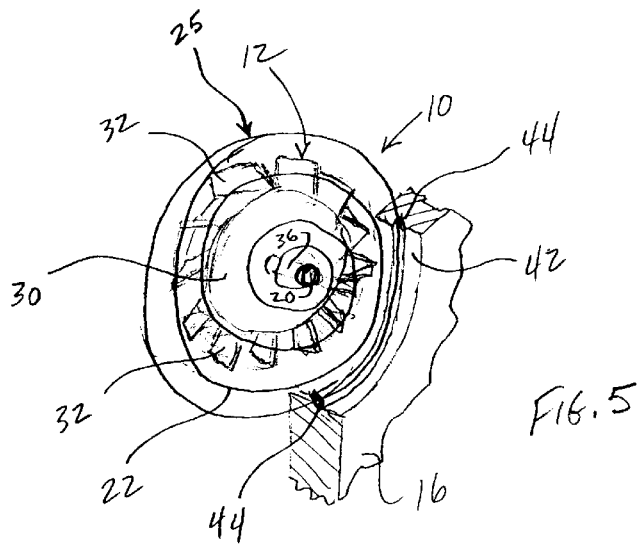
FIG. 5 is a pictorial view of the structure of FIG. 3 with portion s of the wall broken away to shoo detail.
Figure 3:
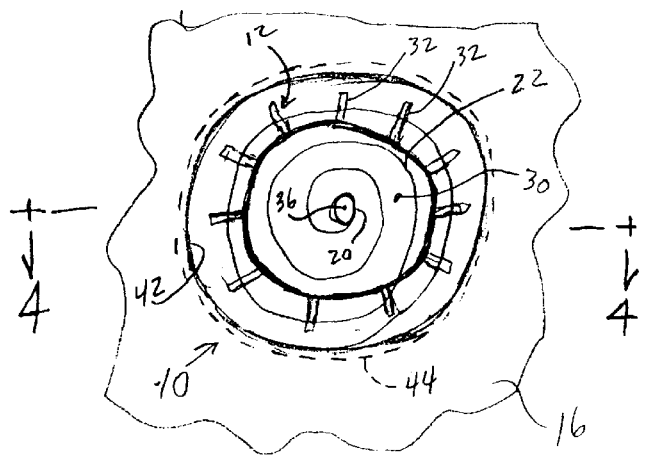
FIG. 3 is a plan view of a structure in which a fan is mounted according to the invention.
Figure 4:
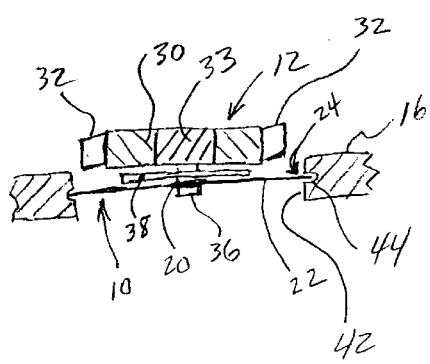
FIG. 4 is a cross sectional view of the structure of FIG. 3, taken along line 4—4 of FIG. 3.

As best shown in FIGS. 3–5, the mount 10 may be used to mount a fan 12 adjacent to or wholly or partly ventilation opening 41 in a housing wall 16. The opening 41 is circular, and ripheral wall 42 through the thickness of the housing wall 16. A peripheral groove 44 is formed around the peripheral wall 42. The periphery 24 of the spring mount 10 is sized slightly larger than the ventilation opening 41, so that the periphery 24 can be snap fit into the groove 44. The outer end 25 of the wire forming the spring 10 is formed to approach the previous turn of the spiral. When snap fit into the groove 44, the spring mount 10 is positioned within the plane of the housing wall 16, with the retainer 20 at the center of the opening. No space inside or outside the housing wall 16 is needed for the mount itself.

The fan 12 may be attached to the mount 10 as shown in FIG. 4. In the example shown, the fan has a rotor 30 from which protrude a plurality of vanes 32. The rotor and vanes rotate about the fan stator 33. A mandrel 36 extends behind the stator 33. A printed circuit board 38 is fitted onto the mandrel 36 part way along the length of the mandrel, and is connected to the fan 10 and to a power source, such as a battery, by conductors (not shown). In one embodiment, the fan is mounted to provide reactant air to a metal-air battery, and the fan and circuit board draw operating power from the metal-air battery. The end of the mandrel is press fit into the spring mount's retainer 20, which is sized slightly smaller than the mandrel.

Figure 6:
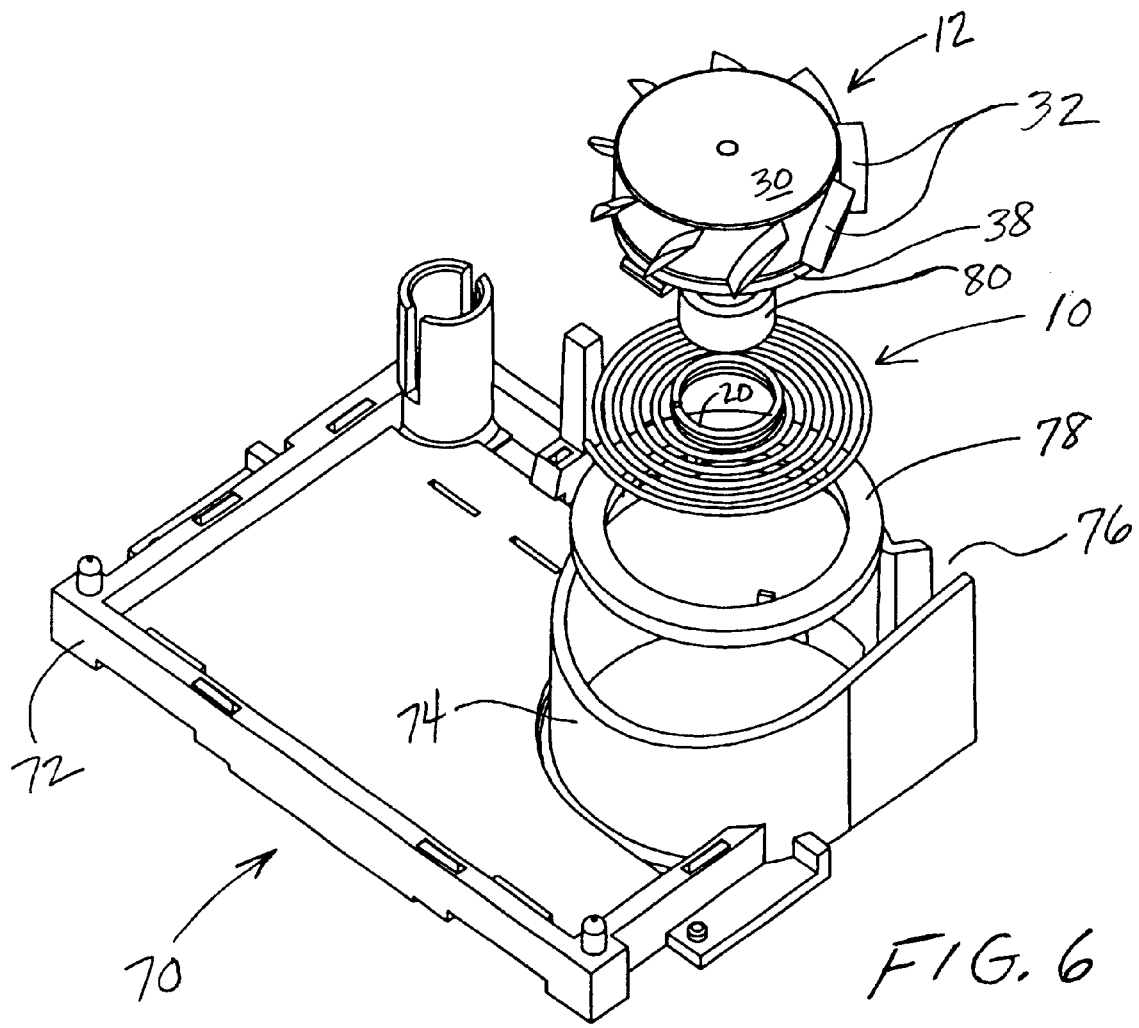
FIG. 6 is an exploded pictorial view of an additional embodiment of the present invention showing a fan mounted in a blower housing.

Another embodiment of the present invention is shown in FIG. 6, in which an air manager 70 for a metal-air battery is shown. The air manager 70 is designed to provide air to air cathodes of metal-air cells (not shown) in a removable battery pack for a cellular telephone or the like. The air manager 70 includes a base 72 on which is mounted a generally circular blower housing 74. The blower housing 74 defines a tangential blower outlet 76 that leads to the air cathodes (not shown). In the alternative, the fan may draw air from the air cathodes and the outlet 76 may lead to the outside environment. A suitable plastic material may be used to mold the base 72 and blower housing 74, integrally if desired, although the choice of material and construction is not critical. A spacer ring 78 of plastic or gasket material is press fit into the blower housing to form a platform for a spring mount 10 as described herein. The ring 78 may be glued in place if desired, and may be spaced above the floor of the blower housing 74. The isolation spring mount 10 preferably has its peripheral turn 24 glued to a surface of the spacer ring 78, leaving the other turns free.

In this embodiment, the mandrel of the fan 12 is formed by an oil cap 80 that contains oil for lubricating a bearing (not shown) of the fan 12. The oil cap 80 is glued to the center of the fan stator in a manner allowing communication of the oil to the bearing, in a manner well known in the art. Fixed to the fan stator, the oil cap can be press fit into the spring retainer 20, or glued if desired. As described above, the fan 12 and its control circuit 38 are connected to the metal-air battery, which provides power for their operation. When power is supplied, the fan rotor 30 turns, the vanes 32 draw air axially into the blower housing 74, and force air tangentially out through the outlet 76. The outlet 76 may be aligned to force air through a diffusion passageway of the type described in U.S. Pat. No. 5,919,582 (incorporated herein by reference) for isolating the metal-air cells when the fan is not operational.

It should be understood that the damping characteristics of the mount 10 can be selected to fit the device to be mounted on it. One characteristic is the strength of the spring, which should be able to support the weight of the fan or other device, and maintain it in position despite the forces exerted by the vibrating device. Another characteristic is the damping capability of the spring, which depends on its spring constant K. The spring constant K is determined by the material and dimensions of the wire forming the spring, and preferably is selected in relation to the vibration frequency of the supported device. For example, a fan operating at a known rpm will produce a related vibration frequency.

An advantageous material is a wire between 0.012 and 0.020 inch in diameter, and the preferred diameter is about 0.016 inch. The preferred material is piano wire. An advantageous length of wire forming the spring is at least 4 inches, preferably between 4 and 8 inches, and most preferably about 6.25 inch. An advantageous diameter of the spiral at its periphery 24 is at least 0.375 inch, preferably between 0.375 and 0.630 inch, and most preferably about 0.580 inch. An advantageous spring constant is between 0.188 and 0.5, preferably about 0.312.

Figure 7:
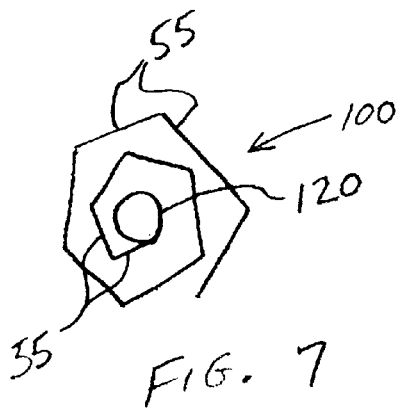
FIG. 7 is a plan view of an alternate spiral spring mount.
Figure 8:
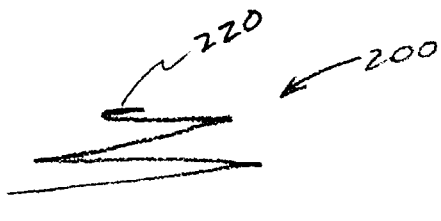
FIG. 8 is a plan view of another alternate spiral spring mount.

Although the preferred mount 10 is a flat spiral spring, the invention can be practiced using springs having many different shapes. For example, a spring 100 may be a spiral consisting of connected discrete segments 55, as shown in FIG. 7, extending from a retainer 120. Also, as shown in FIG. 8, a spiral spring 200 may climb out of a plane to a retainer 220 and form a cone. These are only examples of many ways in which the spring may be shaped to extend through an arc from the retainer to a location where the spring is held to a structure.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A damping device for mounting a vibration-prone device to a structure, comprising:

a retainer adapted to hold a vibration-prone device; and a single arcuate spring extending from the retainer in an arc, the arc turning through at least 360 degrees, and the spring being adapted to be held to the structure at a location spaced along the arc from the retainer.

2. A damping device for mounting a vibration-prone device to a structure, comprising:

a retainer adapted to hold a vibration-prone device; and a spring comprising a wire extending from the retainer In an arc, the wire being adapted to be held to the structure at a location spaced along the arc from the retainer.

3. A damping device for mounting a vibration-prone device to a structure, comprising:

a retainer adapted to hold a vibration-prone device; and a spring extending from the retainer in a figure, the spring adapted to be held to the structure at a location spaced along the figure from the retainer, and the figure between the retainer and the structure being shaped to allow resilient motion in at least three orthogonal directions.

4. A cellular telephone housing comprising:

a support member having a thickness and defining therethrough an opening having a peripheral wall; and a vibration-damping fan mount including a spiral spring defining a central fitting shaped to engage a portion of a fan and an outer turn shaped to engage the peripheral wall of the opening.

5. A damping device for mounting a vibration-prone device to a structure, comprising:

a retainer adapted to hold a vibration-prone device; and a single arcuate spring extending from the retainer in a spiral arc, wherein the spring is adapted to be held to the structure at a location spaced along the arc from the retainer, and wherein the spiral comprises multiple turns.

6. A damping device for mounting a vibration-prone device to a structure, comprising:

a retainer shaped to receive a vibration-prone device; and a spring extending from the retainer in an arc, the spring being adapted to be held to the structure at a location spaced along the arc from the retainer;

wherein the arc is a spiral comprising multiple turns, and the spiral comprises wire and includes an outer turn shaped to be received in a peripheral groove provided by the structure.

7. A damping device for mounting a vibration-prone device to a structure, comprising:

a retainer adapted to hold a vibration-prone device; and a single arcuate spring extending from the retainer in a spiral arc, wherein the spring is adapted to be held to the structure at a location spaced along the arc from the retainer, and wherein the spiral comprises a plurality of connected discrete segments.

8. The damping device of claim 5, wherein the spiral includes turns lying generally in one plane.

9. A damping device for mounting a vibration-prone device to a structure, comprising:

a retainer shaped to receive a vibration-prone device; and a spring extending from the retainer in an arc, the spring being adapted to be held to the structure at a location spaced along the arc from the retainer;

wherein the arc is a spiral, the spiral includes turns lying generally in one plane, and the spring comprises a wire.

10. A damping device for mounting a vibration-prone device to a structure, comprising:

a retainer shaped to receive a vibration-prone device; and a spring extending from the retainer in an arc, the spring being adapted to be held to the structure at a location spaced along the arc from the retainer; wherein the spring comprises a wire.

11. The damping device of claim 1, wherein the arc comprises a plurality of connected discrete segments.

12. A damping device for mounting a vibration-prone device to a structure, comprising:

a retainer shaped to receive a vibration-prone device; and a spring extending from the retainer in an arc, the spring being adapted to be held to the structure at a location spaced along the arc from the retainer;

wherein the spring comprises a wire and the retainer comprises an end portion of the wire formed to a shape for receiving the vibration-prone device.

13. A damping device for mounting a vibration-prone device to a structure, comprising:

a retainer shaped to receive a vibration-prone device; and a spring extending from the retainer in an arc, the spring being adapted to be held to the structure at a location spaced along the arc from the retainer;

wherein the end portion of the wire is wound to form a cylinder for receiving a mandrel of a fan.

14. A ventilation system including a structure and a damping device mounting a fan to the structure, the damping device comprising:

a retainer shaped to receive the fan; and a spring extending from the retainer in an arc, the spring being held to the structure at a location spaced along the arc from the retainer.

15. A metal-air cell housing including a damping device mounting a fan to the housing, the damping device comprising:

a retainer shaped to receive the fan; and a spring extending from the retainer in an arc, the spring being held to the housing at a location spaced along the arc the retainer.

16. A cellular telephone housing including a damping device mounting a vibration-prone device to the housing, the damping device comprising:

a retainer shaped to receive the vibration-prone device; and a spring extending from the retainer in an arc, the spring being held to the housing at a location spaced along the arc from the retainer.

17. A vibration-damping fan mount, comprising:

a support member having a thickness and defining therethrough an opening having a peripheral wall;

a spiral spring defining a central fitting shaped to engage a portion of a fan and an outer turn shaped to engage the peripheral wall of the opening.

18. The fan mount of claim 17, wherein the peripheral wall of the opening defines a groove, and wherein the outer turn of the spiral spring fits into the groove.

19. The fan mount of claim 18, wherein the groove encircles the peripheral wall, and the outer turn forms a loop that resiliently snaps into the groove.

20. A metal-air battery housing comprising:

a support member having a thickness and defining therethrough an opening having a peripheral wall; and a vibration-damping fan mount including a spiral spring defining a central fitting shaped to engage a portion of a fan and an outer turn shaped to engage the peripheral wall of the opening.

* * * * *